United States Patent
Deng et al.

(10) Patent No.: US 6,973,224 B1
(45) Date of Patent: Dec. 6, 2005

(54) MULTI-CHANNEL POLARIZATION BEAM COMBINER/SPLITTER

(75) Inventors: Qi Deng, Cupertino, CA (US); Liren Du, San Jose, CA (US); Shuqing Ma, Sunnyvale, CA (US); Bing Zhang, San Jose, CA (US); Xiwen Wang, Coram, NY (US); Yonglin Huang, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 146 days.

(21) Appl. No.: 10/697,544

(22) Filed: Oct. 30, 2003

Related U.S. Application Data

(60) Provisional application No. 60/422,402, filed on Oct. 30, 2002.

(51) Int. Cl.[7] ................................................. G02B 6/00
(52) U.S. Cl. ............................. 385/11; 385/20; 385/34
(58) Field of Search ............................. 385/11, 16–24, 385/31–36

(56) References Cited

U.S. PATENT DOCUMENTS 6,876,784 B2 * 4/2005 Nikolov et al. ............... 385/11

OTHER PUBLICATIONS

Wavesplitter—Lighting the Internet on Fiber, *WavePump Raman Pump Laser Combiner*, Nov. 2001 (2 pages).

* cited by examiner

*Primary Examiner*—Phan T. H. Palmer
(74) *Attorney, Agent, or Firm*—Workman Nydegger

(57) ABSTRACT

A polarization beam combiner/splitter ("PBCS") for combining and splitting multiple channels of light beams simultaneously is disclosed. The PBCS includes a first fiber array, a second fiber array, and an optical core composed of a birefringent or other suitable material. The first fiber array includes a plurality of optical fiber pairs, while the second fiber array includes a corresponding plurality of optical fibers. The optical core is sized to modify light beams from any of the optical fibers of the first or second array. In a beam combining operation, multiple channels of polarized beams are emitted by the optical fiber pairs of the first fiber array and passed through the optical core, which combines the beams into dual-polarized combined light beams. The combined beams exit the optical core and are received by the second array of optical fibers. A similar beam splitting operation can be performed on multiple combined beams.

23 Claims, 4 Drawing Sheets

MULTI-CHANNEL POLARIZATION BEAM COMBINER/SPLITTER

CROSS-REFERENCE TO RELATED APPLICATIONS

This application claims the benefit of U.S. Provisional Application No. 60/422,402, filed Oct. 30, 2002, which is incorporated herein by reference in its entirety.

BACKGROUND OF THE INVENTION

1. The Field of the Invention

The present invention generally relates to optical communication networks and related components. In particular, the present invention relates to a device for simultaneously combining and splitting multiple channels of polarized beams of light for use in optical components.

2. The Related Technology

Polarization beam combiners and splitters ("PBCSs") are prevalent in modern optical communications systems. PBCSs, which combine two plane-polarized optical signals into a single dual-polarized combined signal, or alternatively separate a dual-polarized combined beam into two discrete plane-polarized beams, are employed in a variety of optical apparatus, including optical amplifiers, transceiver modules, etc.

As mentioned, one application where a PBCS can be used is in an optical amplifier, such as a Raman amplifier or erbium-doped fiber amplifier (EDFA). These amplifiers are used to increase the strength of an optical signal to enable its transmission over large distances. A PBCS is typically employed within an optical amplifier to combine polarized light beams from two pump lasers into a combined beam for use in amplifying a data-containing main optical signal.

Known PBCS devices are typically configured as mono-channel devices, wherein the PBCS is capable of combining only two light beams into a combined beam. However, as optical systems technology advances, optical amplifiers are increasingly being configured as multi-channel devices, wherein multiple channels of light beam pairs must be combined. In an attempt to meet this need, optical amplifiers and similar devices may need to employ multiple mono-channel devices in order to provide the needed beam combining operations.

The above attempted solution, however, is complicated by the fact that the size of optical amplifiers and other devices that employ PBCSs is progressively being reduced due to the drive for space minimization. Thus, new means are continually being sought to minimize the amount of space occupied by components located within optical devices. Thus, to the extent that multiple PBCSs must be employed in an optical amplifier or other optical device, the quest for space minimization is thwarted.

Concurrent with the above concern is the ever-present aim of reducing the complexity of optical devices, including optical amplifiers and other optical devices. Indeed, to the extent that an optical device can be simplified in design, the cost to produce the device is reduced while its utility in a greater number of applications is maintained or increased. As such, common optical devices, such as optical amplifiers that include numerous interior components, present a particular challenge in terms of maximizing device simplicity.

In view of the above, a need exists in the art for an optical device that overcomes the above challenges. In particular, a need exists for an optical device that can perform multi-channel polarization beam combination and splitting operations. Furthermore, any solution to these needs should be implemented in a simple design that is able to reduce the overall complexity of the apparatus or device in which the solution is disposed.

BRIEF SUMMARY OF THE INVENTION

The present invention has been developed in response to the above and other needs in the art. Briefly summarized, embodiments of the present invention are directed to a multi-channel polarization beam combiner/splitter for use in optical devices, such as an optical amplifier. The multi-channel polarization beam combiner/splitter is configured to combine or separate multiple channels of light beams simultaneously, thereby offering a significant advantage in terms of functionality and simplicity for newer optical amplifiers and the like that are configured to operate with several optical signal channels.

In one embodiment of the present invention, the multi-channel polarization beam combiner/splitter is composed of several components including a first array of optical fiber pairs, a second array of optical fibers, and an optical core. The first array of optical fiber pairs includes polarization maintaining fibers that are arranged in N pairs to form a 1×N configuration. In contrast, the second array of optical fibers includes a number N of single mode fibers that are individually arranged in a 1×N configuration. As such, one pair of optical fibers of the first array is positioned opposite a corresponding optical fiber of the second array.

The optical core is interposed between the first and second arrays. In one embodiment, the optical core includes a birefringent material that is capable of combining and/or splitting polarized light beams during operation of the multi-channel polarization beam combiner/splitter.

In a first beam combining operation, the multi-channel polarization beam combiner/splitter receives a plurality of plane-polarized first and second beams of light via the first array of optical fiber pairs. Each pair of plane-polarized first and second beams is collimated by the respective optical fiber pair of the first array before being received by the optical core. Upon receiving each of the first and second beam pairs, the optical core, owing to its birefringent nature, deflects the second beams toward the first beams as they travel through the optical core on such that, upon exit from the optical core, dual-polarized combined beams of light are formed from the former first and second beams. The combined light beams are then received by respective optical fibers of the second fiber array, which collimate the combined light beams before directing them for further travel within the optical communications network. The plurality of combined light beams produced by the optical core are dual-polarized light beams having the same polarizations as the first and second light beams that were introduced into the optical core.

In a second beam splitting operation, a plurality of dual-polarized combined light beams are collimated by each of the fibers of the second fiber array before being received by the optical core. Upon passage through the optical core, each of the combined beams is split into first and second plane-polarized beam pairs having orthogonal polarizations. The plurality of first and second beam pairs then exit the optical core and are received by a respective pair of optical fibers of the first fiber array, where they are collimated before proceeding through the optical communications network. In this way, then, multiple light beams can be combined or separated as desired for use by a particular optical device such as an optical amplifier, or some other component.

The optical core in one embodiment is a birefringent block. However, in other embodiments, the optical core can comprise multiple birefringent components such as, in one case, dual birefringent wedge portions that are arranged to form a Wollaston prism.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1–4 depict various features of embodiments of the present invention, which is generally directed to a multi-channel polarization beam combiner/splitter for use in optical apparatus and systems. The design of the multi-channel polarization beam combiner/splitter is such that multiple channels of light beams can be combined or separated simultaneously, leading to a significant advantage in optical throughput and simplicity over known beam combiners/splitters.

Figure 1:
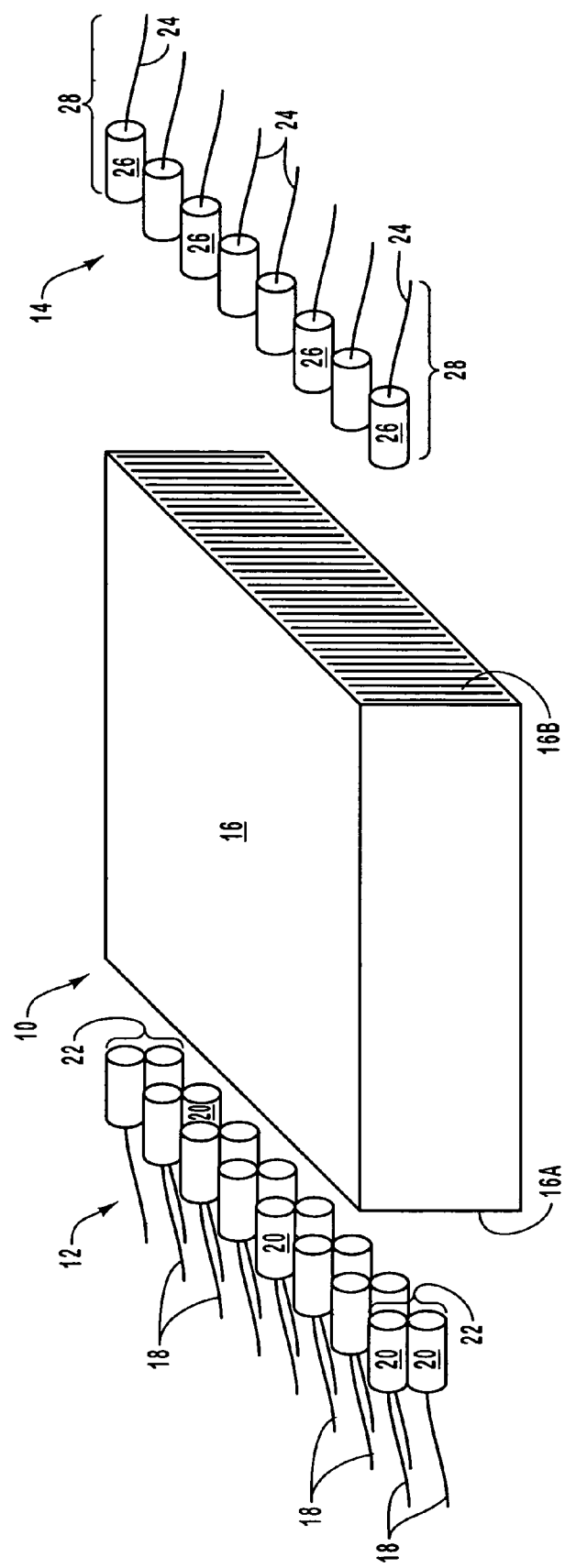
FIG. 1 is a simplified view of a multi-channel polarization beam combiner/splitter according to one embodiment of the present invention.

Reference is first made to FIG. 1, which depicts various components that are included in one embodiment of the present invention. In detail, a polarization beam combiner/splitter ("PBCS"), generally designated at 10, is shown. The PBCS 10 includes various components, among them a first array 12 of optical fiber pairs, a second array 14 of optical fibers, and an optical core 16. The PBCS 10 as shown in FIG. 1 can be included in one of a variety of optical components, such as a Raman optical amplifier, for instance.

The first array 12 of optical fiber pairs includes a plurality of optical fibers 18 optically coupled to corresponding collimating elements 20. These components are arranged in N fiber array element pairs 22 to form a 1×N arrangement of the first array 12. FIG. 1 shows that in each fiber array element pair 22, one optical fiber-collimating element is positioned below another optical fiber-collimating element to form the 1×N first array. Other configurations are also possible.

In the present embodiment, each optical fiber 18 of the first array 12 is a polarization maintaining optical fiber. As such, each optical fiber 18 has a slow optical axis. The slow optical axes of the two optical fibers 18 in each fiber array element pair 22 in the first array 12 are arranged to be perpendicular to one another and to match the polarization of light beams that are to pass therethrough, as will be explained further below. In other embodiments, the optical fibers can include other fiber types.

The second array 14 of optical fibers includes a plurality of optical fibers 24 optically coupled to corresponding collimating elements 26. These components are arranged to form a 1×N linear array of fiber array elements 28, as shown in FIG. 1. Each of the N fiber array elements 28 of the second array 14 is positioned opposite a corresponding one of the N fiber array element pairs 22 of the first fiber array 12 across the optical core 16. This correspondence between the fiber array element pairs 22 and fiber array elements 28 enables the beam combining and splitting operations of the present invention to be realized, as seen further below.

In one embodiment, the optical fibers 18 and collimating elements 20 that form each fiber array element pair 22 of the first array 12, as well as the optical fibers 24 and collimating elements 26 that form each fiber array element 28 of the second array 14, are configured as pigtails, which are known in the art. Of course, other configurations for these elements, such as collimating elements that are separate and distinct from the optical fibers of the first and second arrays, are also possible.

In the illustrated embodiment, each of the collimating elements 20 and 26 is a collimating lens. In another embodiment, however, the collimating elements of the first fiber array 12 and second fiber array 14 can be configured as one collimating element, such as a lens, for each array. So configured, the first array 12 includes the plurality of optical fibers 18 that are all optically coupled to a first, single collimating element, while the second array 14 includes the plurality of optical fibers 24 that are all optically coupled to a second, single collimating element. The first and second collimating elements in this case have a size sufficient to optically couple with each optical fiber 18 or 24 of the first array 12 and second array 14, respectively.

The optical core 16 in the present embodiment is composed of a birefringent material to enable it to perform the beam combining and beam splitting operations of the PBCS 10. Examples of suitable birefringent materials that can be used to form the optical core 16 include, but are not limited to $YVO_4$, $LiNbO_3$, and $TiO_2$. In addition to these and other birefringent materials, other materials or combinations of materials with suitable characteristics can alternatively be employed in the optical core 16.

In the present embodiment, the optical core 16 is composed of a single piece of birefringent material. As such, the light beams that emanate from and are received by the first and second arrays 12 and 14 all interact with the singular optical core 16 in beam combining and splitting operations. In other embodiments, however, the optical core 16 can be composed of two or more pieces. In one embodiment, for example, the optical core 16 can be composed of multiple pieces that are each arranged to interact with a specified one of each fiber array element 28 and corresponding fiber array element pair 22 of the second and first arrays 14 and 12. In such a case, the light beams traveling through a specified fiber array element would interact with a corresponding optical core element.

As shown in FIG. 1, in one embodiment the optical core includes a first planar face 16A and a second planar face 16B. The first planar face 16A is oriented perpendicular to incident light beams from the first array 12, i.e., such that light beams emanating from the first array impinge on the first planar face 16A at substantially right angles during operation of the PBCS 10. Similarly, the second planar face 16B is oriented perpendicular to incident light beams from the second array 14, i.e., such that light beams emanating from the second array impinge on the planar face 16B at substantially right angles during PBCS operation. Alternatively, the first array 12 and second array 14 can be positioned to direct light beams at a perpendicular orientation toward the faces 16A and 16B of the optical core 16, if desired. In yet other embodiments, the faces of the optical core can be configured in other ways to impart specified characteristics to embodiments of the PBCS.

Additionally, it is noted that each of the components described herein can be incorporated into an optical device, and can be self-contained within an outer housing, if desired.

Figure 2:
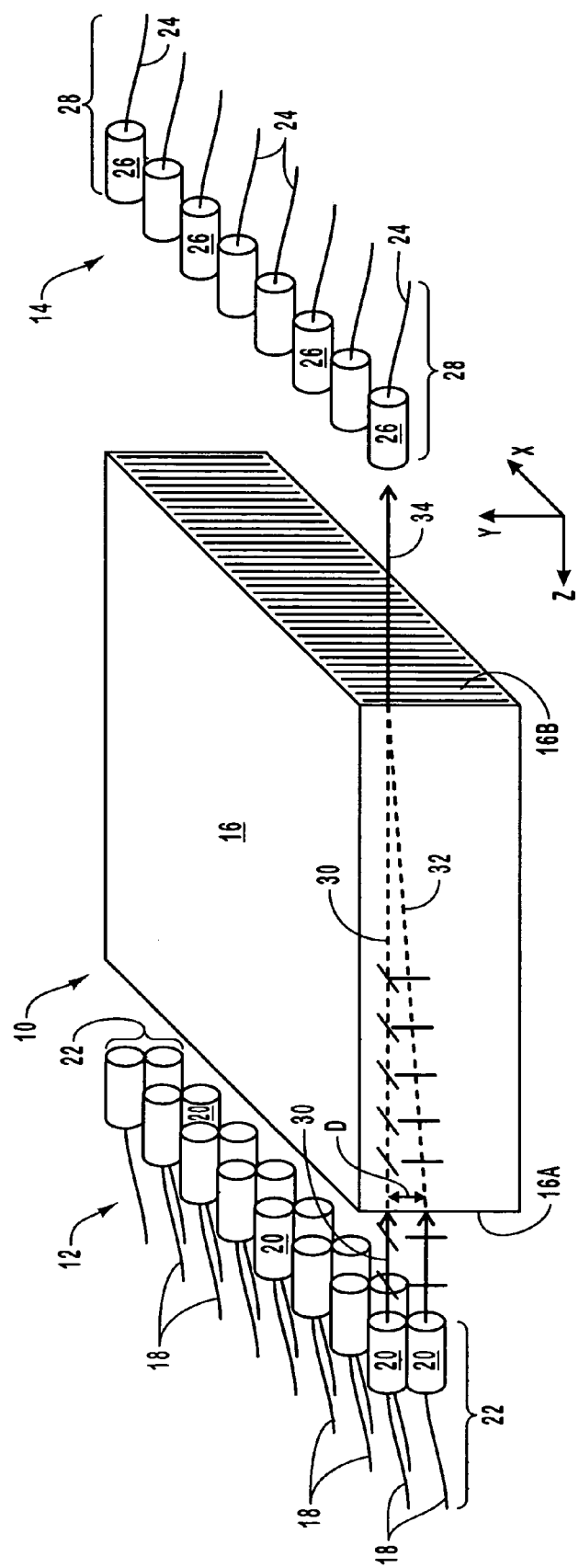
FIG. 2 is a simplified view of the multi-channel polarization beam combiner/splitter of FIG. 1 in a first operational state.

Reference is now made to FIG. 2, which describes various details regarding operation of the present PBCS in a first, multi-channel beam combining operation. In this operation, multiple beams of plane-polarized light are emitted from each of the fiber array element pairs 22 of the first fiber array 12. For purposes of illustration, only one set, or channel, of these multiple beams is shown in FIG. 2. The description to follow, however, applies to each channel that is treated by the PBCS 10. In particular, a first beam 30 of light and a second beam 32 of light are emitted from the two optical fibers 18 of the fiber array element pair 22. The collimating elements 20 of the fiber array element pair 22 collimate the light beams 30 and 32 such that they proceed toward the optical core 16 in a substantially parallel trajectory. As shown in FIG. 2, each of the first and second beams 30 and 32 are plane-polarized orthogonally one with another.

After emission from the respective fiber array element pair 22, the first and second beams 30 and 32 are received by the optical core 16 by passing through the first planar face 16A. As mentioned, the PBCS 10 is configured such that the first and second beams 30 and 32 impinge on the first planar face 16A perpendicularly and then pass through the interior of the optical core 16.

The optical core 16, as mentioned, is configured to combine the first and second beams 30 and 32. In the illustrated embodiment, the optical core 16 is composed of a birefringent material that can cause the polarized first and second beams 30 and 32 to converge. In detail, birefringent materials possess differing indices of refraction, according to the polarization of the light beams passing therethrough. In the present embodiment, the first beam 30 is referred to as an ordinary beam, or O-beam, because of its polarization in the X-Z plane, as indicated by the horizontal lines on the beam in FIG. 2. In contrast, the second light beam 32 is referred to as an extraordinary beam, or E-beam, because of its polarization in the Y-Z plane, as indicated by the vertical lines on the beam.

The passage of the first and second beams 30 and 32 through the optical core 16 affects the beams differently, owing to both the birefringent nature of the optical core 16 in the present embodiment and the polarizations of the beams. The first beam 30, being the O-beam, is unaffected in propagation direction by the optical core, and passes through the core without deflection. The second beam 32, however, as the E-beam, is deflected by the optical core in the Y-direction toward the first beam. The second beam 32 is deflected toward the first beam 30 a specified amount. The magnitude of this deflection in the Y-direction is referred to as the walk-off distance D, and is indicated in FIG. 2.

The size and birefringent nature of the optical core 16, as well as the initial separation of the first and second beams 30 and 32, can be configured such that the second beam combines with the first beam upon passage through the optical core 16. A combined beam 34 is thus formed, and is shown in FIG. 2 exiting the optical core 16 at the second planar face 16B. The combined beam 34 is characterized as a dual-polarized light beam, having two polarizations that correspond to the plane polarizations possessed by the first and second beams 30 and 32 before combination of the beams occurred.

After exiting the optical core 16, the combined beam 34 is then received by the respective fiber array element 28 of the second fiber array 14 that corresponds to the fiber array element pair 22 of the first fiber array 12. The combined beam 34 can then be forwarded as needed via the optical device or network.

Again, it is to be remembered that the beam combination process described above can occur simultaneously in each of the fiber array elements of the first and second arrays. Indeed, in the illustrated embodiment, eight fiber array element pairs 22 and eight corresponding fiber array elements 28 are positioned in the first and second fiber arrays 12 and 14, respectively. As such, eight combined light beams can be simultaneously produced by the illustrated PBCS 10. In accordance with principles of the present invention, more or less fiber array elements than eight can be configured in a PBCS.

Figure 3:
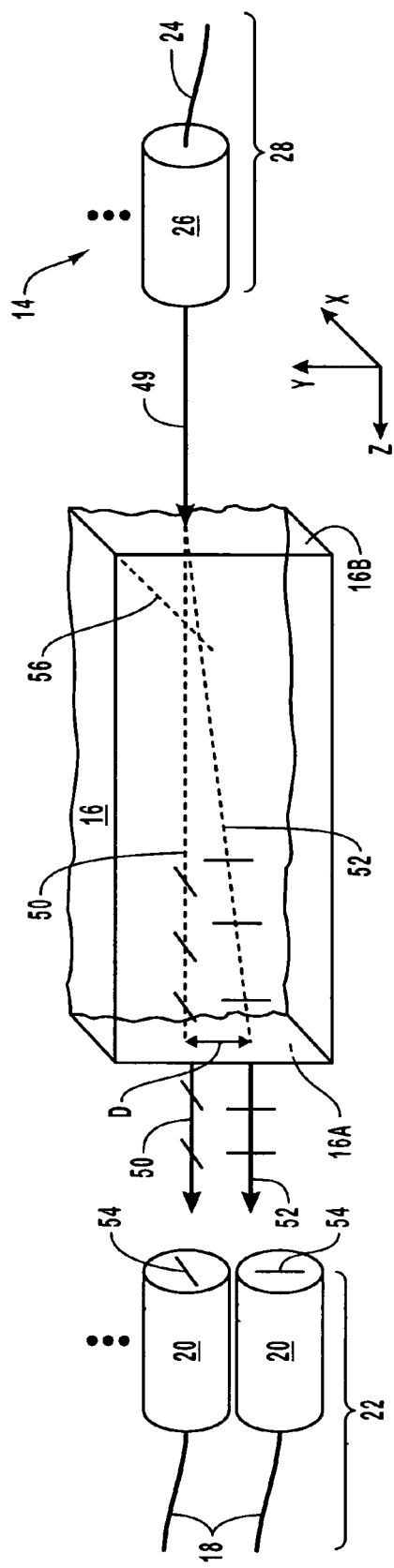
FIG. 3 is a close-up view of the multi-channel polarization beam combiner/splitter of FIG. 1 in a second operational state.

Reference is now made to FIG. 3, which shows a portion of the PBCS 10 of FIG. 1 in describing a second, beam splitting operation, in accordance with one embodiment of the present invention. As before, for purposes of clarity only one channel of light beams are shown being modified by the PBCS 10. However, it is appreciated that multiple channels can be simultaneously modified by the present PBCS 10. For instance, in the PBCS of FIG. 1, up to eight channels can be modified, as will be described below.

FIG. 3 shows a dual-polarized combined beam 49 that is emitted from a representative one of the optical fibers 24 of one of the fiber array elements 28 of the second array 14 (FIG. 2). The combined beam 49 is collimated by the collimating element 26 of the respective fiber array element 28, then received by the optical core 16 (a portion of which is shown in FIG. 3) by passing through the second planar face 16B which, as already described, is oriented to receive the combined beam 49 at a perpendicular orientation.

Upon passage into the optical core 16, the dual-polarized combined beam 49, owing to the birefringent nature of the optical core, is split into a first beam 50 and a second beam 52. The first and second beams 50 and 52 are plane-polarized according to the dual-polarization of the former combined beam 49. As such, the second beam 52 is referred to as the E-beam, as was the case in connection with the embodiment described in FIG. 2. Similarly, the first beam 50 is referred to as the O-beam. The optical core 16 therefore causes deflection of the second beam 52, as the E-beam, away from the first beam 50 in the −Y-direction. The optical core 16 can be configured such that, upon exiting the optical core at the first planar face 16A, the second beam 52 has deflected away from the first beam 50 a vertical walk-off distance D. In contrast, the first beam 50, as the O-beam, encounters no deflection, and proceeds through the optical core 16 on the same path as was initially traveled by the combined beam 49.

The first planar face 16A of the optical core 16 is configured such that it is perpendicular to the direction of propagation of the first beam 50 upon its exit from the optical core. This, in turn, causes the first and second beams 50 and 52 to emerge from the optical core 16 along parallel propagation paths. The first and second beams 50 and 52 are then received by optical fibers 18 of the respective fiber array element pair 22 of the first array 12, which corresponds to the fiber array element 28 of the second array 14 from which the combined beam 49 initially emerged. Note that the slow axes of the optical fibers 18, indicated by lines 54, that receive the first and second beams 50 and 52 are aligned to correspond with the plane polarizations of the beams, which are indicated by the lines on each beam. The polarizations of the first and second beams 50 and 52 are orthogonal to one another.

FIG. 3 further illustrates an optical axis 56 of the optical core 16. As shown, the optical axis 56 in the present embodiment is neither parallel nor perpendicular to the propagation path of the combined beam 49 or first and second beams 50 and 52. This is desirable to ensure proper operation of the optical core 16.

Again, though FIG. 3 depicts only one channel of light beams, the PBCS of the present invention is configured to handle a plurality of such channels simultaneously. Further, it is appreciated that the present PBCS can be configured such that light beam channels traveling simultaneously in either direction through the PBCS in the various fiber array elements can be processed by the PBCS without difficulty, thereby expanding the utility of the present invention.

Figure 4:
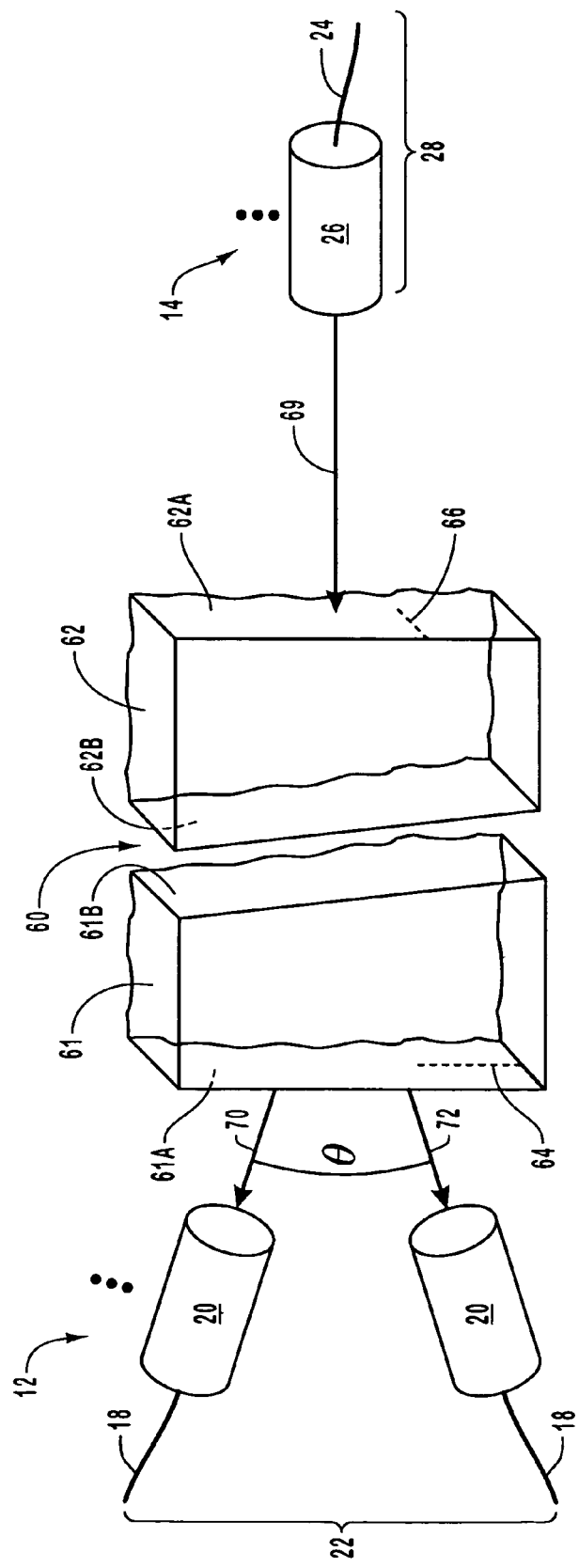
FIG. 4 is a simplified view of portions of a multi-channel polarization beam combiner/splitter according to another embodiment of the present invention.

Reference is now made to FIG. 4. In embodiments of the present invention, the optical core can be designed with various configurations that preserve the utility of the PBCS. FIG. 4 depicts one such embodiment. Here, the optical core of the PBCS 10 shown in previous embodiments is replaced by an optical core 60 that includes complementarily shaped optical core portions. In detail, a first wedge portion 61 and a second wedge portion 62 are positioned in the PBCS 10 as shown in FIG. 4, which shows a portion of each wedge portion. The first and second wedge portions 61 and 62 include planar faces 61A and 62A, and angled faces 61B and 62B, respectively. The first and second wedge portions 61 and 62 are interposed between the first and second fiber arrays 12 and 14 such that the planar faces 61A and 62A face toward the first array 12 and second array 14, respectively. Similarly, in this configuration the angled faces 61B and 62B face one another such that a substantially equal spacing exists between the angled faces, as shown in FIG. 4.

In the present embodiment, both the first and second wedge portions 61 and 62 are composed of birefringent materials. The first wedge portion 61 includes an optical axis 64, while the second wedge portion 62 includes an optical axis 66. The two optical axes 64 and 66 of the birefringent first and second wedge portions 61 and 62 are such that they are perpendicular to one another. This configuration forms a Wollaston prism from the first and second wedge portions 61 and 62.

The Wollaston prism configuration of the optical core 60 is capable of combining and splitting light beams incident on it. Furthermore, the optical core 60 is sized to be able to simultaneously receive and combine and/or split multiple channels of light beams, in accordance with principles of the present invention. As shown in FIG. 4, a dual-polarized combined beam 69 of light, representative of the plurality of light beams that can be processed by the PBCS 10, is emitted by a representative one of the second fiber array elements 28 and is received by the second wedge portion 62 at its planar face 62A. The combined beam 69 passes through both the first and second wedge portions 61 and 62, and by so doing, is split into first and second beams 70 and 72 of light, respectively. Because of the nature and configuration of the first and second wedge portions 61 and 62 that form the optical core 60, the first and second beams 70 and 72 in the present embodiment are emitted from the optical core at a mutual angle θ with respect to one another. As such, the respective fiber array element pair 22 that receives both the first and second beams 70 and 72 is positioned such that each of its collimating elements 26 is able to receive the corresponding light beam, as shown in FIG. 4. As before, the first and second beams 70 and 72 are orthogonally plane-polarized with respect to one another.

It is appreciated that the optical core 60, including the two wedge portions 61 and 62, is but one possible configuration of a multi-piece optical core. Indeed, a variety of other shapes, designs, and configurations can be employed while still residing within the claims of the present invention.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A beam combiner/splitter apparatus, comprising:
   a first array of optical fiber pairs;
   a second array of optical fibers; and
   an optical core interposed between the first and second arrays, wherein the optical core is configured to combine a plurality of pairs of orthogonally polarized beams of light into a plurality of dual-polarized combined beams of light, and wherein the optical core is configured to separate a plurality of dual-polarized combined beams into a plurality of pairs of orthogonally polarized beams.

2. A beam combiner/splitter apparatus as defined in claim 1, wherein the first array includes at least eight optical fiber pairs.

3. A beam combiner/splitter apparatus as defined in claim 1, wherein the optical fibers of the first array are polarization maintaining optical fibers, and wherein the optical fibers of the second array are single mode optical fibers.

4. A beam combiner/splitter apparatus as defined in claim 1, wherein the optical core is composed of a birefringent material.

5. A beam combiner/splitter apparatus as defined in claim 4, wherein the optical core is a single component.

6. A beam combiner/splitter apparatus as defined in claim 4, wherein the optical core is composed of multiple pieces.

7. A beam combiner/splitter apparatus as defined in claim 6, wherein the multiple pieces of the optical core form a Wollaston prism.

8. A beam combiner/splitter apparatus as defined in claim 6, wherein one piece of the optical core is positioned for use by each of the optical fiber pairs of the first array.

9. A beam combiner/splitter apparatus as defined in claim 1, further comprising at least one collimating element.

10. A method of combining a plurality of pairs of orthogonally plane-polarized beams of light, comprising:
  by a first array of optical fiber pairs, collimating the plurality of pairs of orthogonally plane-polarized beams of light;
  passing the plurality of pairs of beams through an optical core such that a second beam of each of the pairs of beams combines with a respective first beam of each of the pairs of beams to form a plurality of dual-polarized combined beams of light; and
  receiving each of the plurality of combined beams into a respective optical fiber of a second array of optical fibers.

11. A method of combining as defined in claim 10, further comprising:
  by the second array of optical fibers, collimating the plurality of combined beams.

12. A method of combining as defined in claim 10, wherein the optical core includes at least one component composed of a birefringent material.

13. A method of combining as defined in claim 10, wherein the plurality of pairs of beams are combined into the plurality of combined beams simultaneously.

14. A method of separating a plurality of dual-polarized combined beams of light, comprising:
  by a second array of optical fibers, collimating a plurality of dual-polarized combined beams of light;
  passing the plurality of combined beams through an optical core such that the combined beams are separated into a plurality of pairs of orthogonally plane-polarized beams of light; and
  receiving each of the plurality of pairs of beams into a respective pair of optical fibers of a first array of optical fiber pairs.

15. A method of separating as defined in claim 14, further comprising:
  by the first array of optical fiber pairs, collimating the plurality of pairs of beams.

16. A method of separating as defined in claim 14, wherein the optical core includes at least one component composed of a birefringent material.

17. A method of separating as defined in claim 14, wherein the plurality of combined beams are separated into the plurality of pairs of beams simultaneously.

18. A polarization beam combiner/splitter, comprising:
  a first array of optical fiber pairs, each optical fiber pair having two optical fibers that are each optically coupled to a respective collimating element;
  a second array of optical fibers, wherein each optical fiber includes a collimating element; and
  an optical core composed of a birefringent material, the optical core being configured to receive a plurality of orthogonally plane-polarized beams of light from the first array and combine the orthogonally plane-polarized beams into a plurality of dual-polarized combined beams of light for receipt by the second array, wherein the optical core is further configured to receive a plurality of dual-polarized combined beams from the second array and separate the dual-polarized combined beams into a plurality of orthogonally plane-polarized beams of light for receipt by the first array.

19. A polarization beam combiner/splitter as defined in claim 18, wherein the optical core is composed of a single piece of birefringent material.

20. A polarization beam combiner/splitter as defined in claim 19, wherein the optical core includes a first and second planar faces that are oriented to perpendicularly receive light beams from the first and second arrays.

21. A polarization beam combiner/splitter as defined in claim 20, wherein the optical fibers of each optical fiber pair of the first array include slow axes that are aligned with the polarizations of the plurality of orthogonally plane-polarized beams of light that are received by the first array.

22. A polarization beam combiner/splitter as defined in claim 21, wherein the collimating elements include collimating lenses.

23. A polarization beam combiner/splitter as defined in claim 22, wherein each collimating lens and respective optical fiber are coupled in a pigtail assembly.

* * * * *